(No Model.)
J. W. CHENEY.
CONVERTING MOTION.
No. 294,761. Patented Mar. 11, 1884.
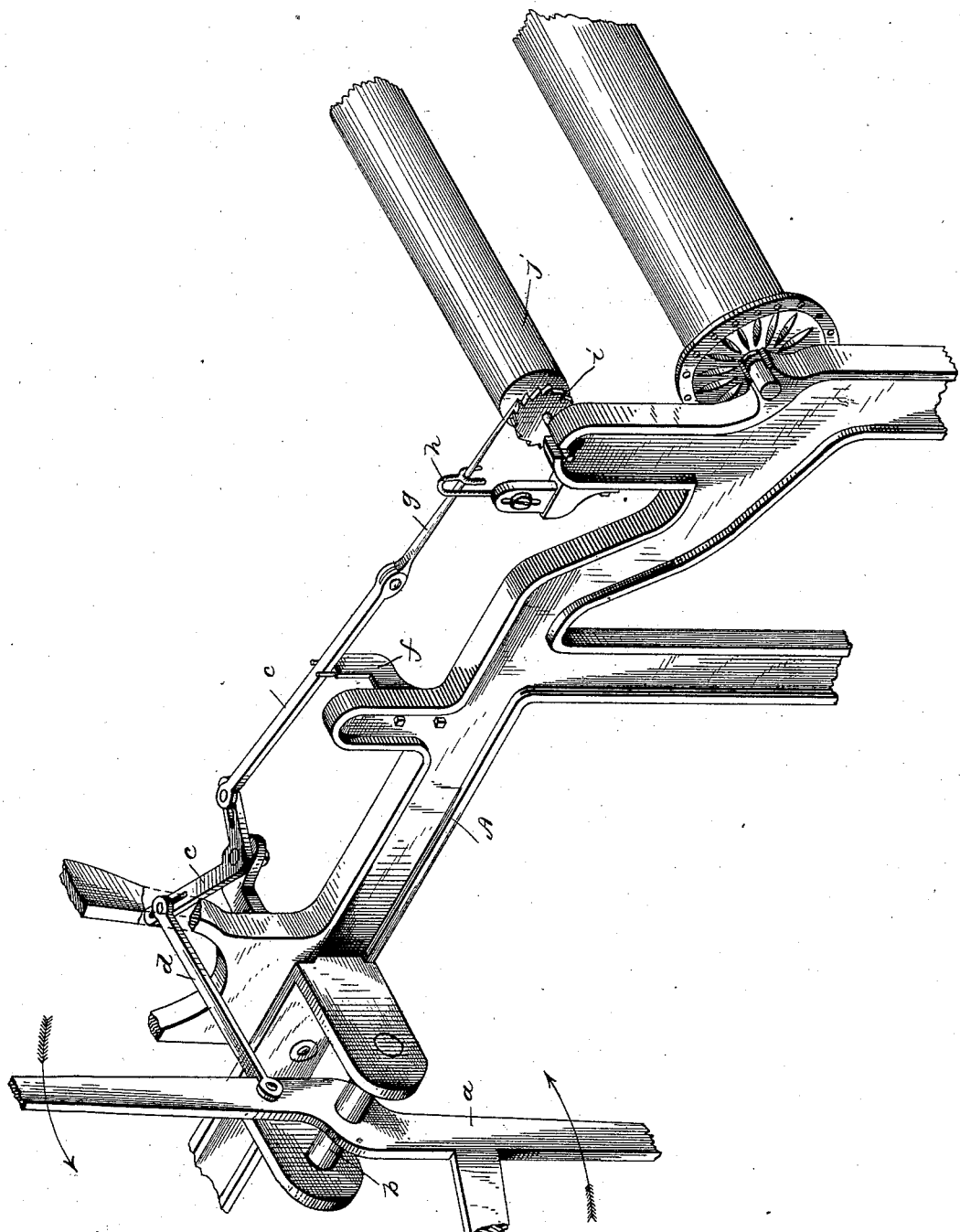
WITNESSES
Franck L. Durand
Edwin A. Finckel
INVENTOR
Joseph W. Cheney
by Charles E. Buell
Attorney

UNITED STATES PATENT OFFICE.

JOSEPH W. CHENEY, OF PALMER, MASSACHUSETTS, ASSIGNOR OF ONE-HALF TO ROSCIUS C. NEWELL, OF SAME PLACE.

CONVERTING MOTION.

SPECIFICATION forming part of Letters Patent No. 294,761, dated March 11, 1884.

Application filed September 12, 1883. (No model.)

*To all whom it may concern:*

Be it known that I, JOSEPH W. CHENEY, a citizen of the United States, residing at Palmer, in the county of Hampden and State of Massachusetts, have invented a certain new and useful Improvement in Converting Motion, of which the following is a specification, reference being had therein to the accompanying drawing.

This invention is in the nature of means for converting the rocking or vibrating motion of the long arm of a lever into an intermittent or step-by-step rotary motion of a shaft; and the invention consists in linking an elbow or bell-crank lever to a rocking or vibrating lever and actuating a pawl-and-ratchet mechanism on the shaft to be rotated through jointed connections with said bell crank or elbow lever.

In the accompanying drawing, illustrating my invention, I have shown in perspective part of one side of the frame of a machine containing elements sufficient for the utilization of my invention.

A may represent the framing of a machine in which my invention is to be applied.

$a$ is a vertical lever or one of a series, pivoted at $b$, and rocked or vibrated upon its pivot or fulcrum.

$c$ is an elbow or bell-crank lever pivoted to move in a horizontal plane, and rocked upon its pivot or fulcrum by a connection of one of its arms, as by a link, $d$, with the lever $a$, and the point of connection of the lever $c$ and link $d$ may be variable, as by slots and pins, so as to vary the length of throw of the elbow-arms, and consequently the length of the transmitted stroke. The other arm of the elbow has jointed to it loosely, and preferably adjustably, a rod, $e$, which is reciprocated in a bracket or bearing, $f$, of the frame, and to this rod is jointed a pawl, $g$, guided by a bracket or hanger, $h$, of the frame, and engaging a ratchet-wheel, $i$, of a shaft, $j$, mounted in suitable bearings on the frame, to rotate said shaft intermittently or step-by-step.

By varying the length of the radius of the arm of the elbow with relation to the link $d$ or the rod $e$, or both, the length of stroke of the rod $e$ may be increased or diminished, and consequently the length of the step-by-step motion of the shaft $j$.

One convenient illustration of the application of my invention is in the let-off mechanism of a loom; but I do not limit my invention to this single use, as it is applicable generally where a rocking or vibrating motion as a source of power is converted into an intermittent rotary motion.

What I claim is—

The combination, substantially as shown and described, of a rocking or vibrating lever, an elbow or bell-crank lever connected therewith by one arm, a rod connected to the other arm of said elbow-lever, a pawl, bearings for said rod and pawl, and a ratchet-shaft engaged by said pawl, as and for the purpose specified.

In testimony whereof I affix my signature in presence of two witnesses.

JOSEPH W. CHENEY.

Witnesses:
 CHARLES E. BUELL,
 GEO. C. BUELL.